April 18, 1939.  C. R. WASEIGE  2,154,591
DRIVING MECHANISM
Original Filed March 18, 1936   2 Sheets-Sheet 1
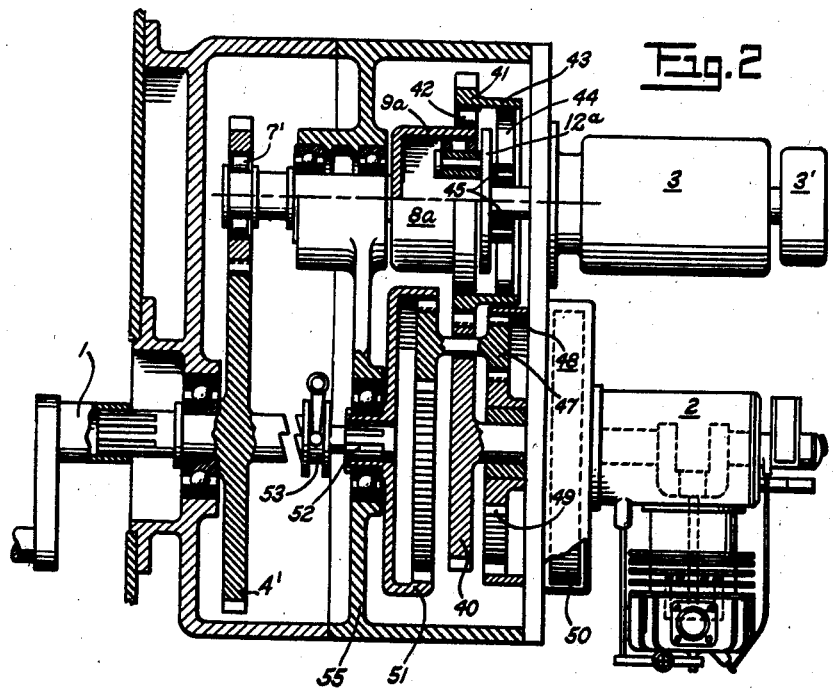
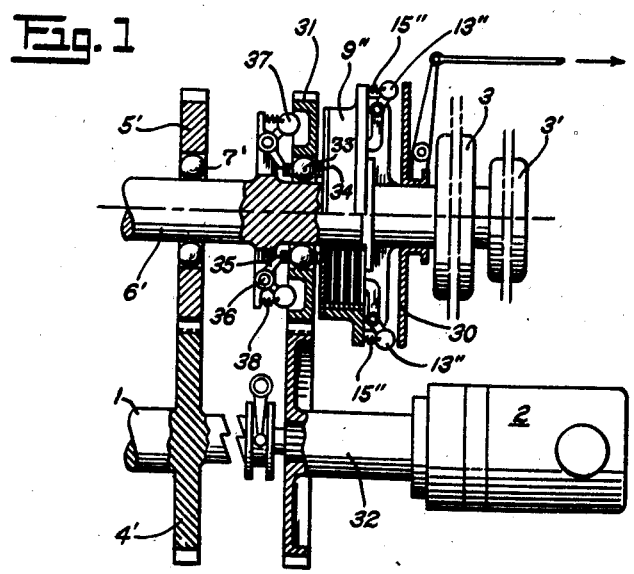
INVENTOR.
Charles Raymond Waseige
BY
ATTORNEY.

April 18, 1939.  C. R. WASEIGE  2,154,591
DRIVING MECHANISM
Original Filed March 18, 1936  2 Sheets-Sheet 2
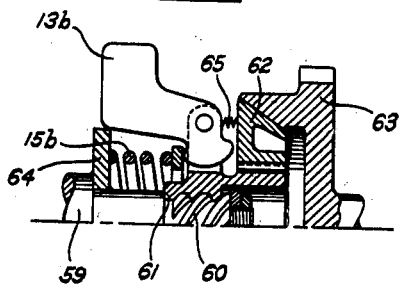
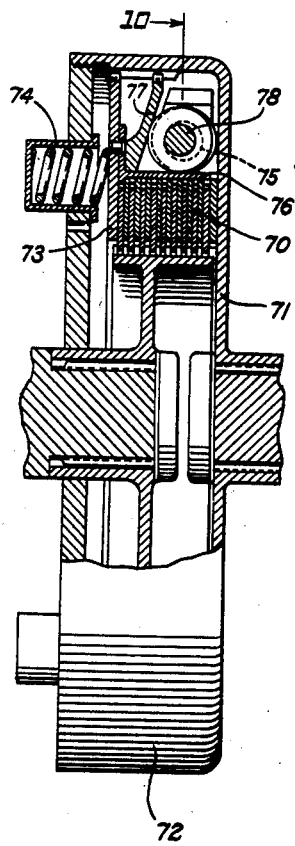
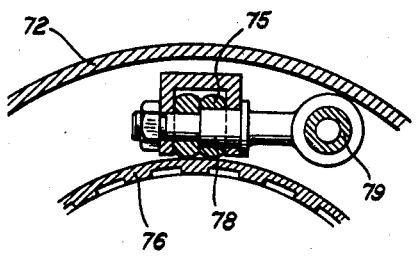
INVENTOR.
Charles Raymond Waseige
BY
ATTORNEY.

Patented Apr. 18, 1939

2,154,591

UNITED STATES PATENT OFFICE 2,154,591

DRIVING MECHANISM

Charles Raymond Waseige, Rueil-Malmaison, France, assignor to Societe Anonyme Air Equipment, Bellancourt, Seine, France, a society of France Original application March 18, 1936, Serial No. 69,558. Divided and this application May 4, 1938, Serial No. 206,063. In France March 29, 1935

3 Claims. (Cl. 60—97)

This invention relates to aircraft, and particularly to the means for propulsion and current generation.

An object of the present invention is to provide means for operating one or more accessory units when the propelling motor is not in use, and chiefly to assure the constant supply of necessary current, without requiring the use of a storage battery or of an auxiliary apparatus, and preferably with the use of the accessories usually employed with the aircraft motor, i. e., starting motor and generator.

The present invention includes a combination of at least three units, that is, a propelling motor for the aircraft, an auxiliary motor, and one or more accessories such as an electric generator, a vacuum or liquid pump, a winch, or the like, the combination being characterized by the fact that the accessory device or devices, which may be connected to the propelling motor by transmission gear, also have connection with the auxiliary motor, and there may also be included means for utilizing the said auxiliary motor as the agency for initial rotation ("starting") of the propelling motor of the aircraft.

In all such cases, it is advantageous, and this is also comprised in the invention, to provide means which assure, if the propelling motor should stop, the automatic starting of the auxiliary motor, by utilizing for this purpose kinetic energy derived from one of the operating units.

On the other hand, chiefly due to the requirements of wireless apparatus, it is advantageous to include in the transmission gear between the generator and the two motors, suitable clutches whose torque transmitting capacity is variable as by a centrifugal device, to permit operation of the generator at constant speed, notwithstanding speed variations of the driving motor.

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

In the drawings:

Figs. 1 and 2 are diagrammatic views suggesting two embodiments of the invention;

Fig. 3 is a detail view;

Fig. 4 is a cross-section of a special friction clutch device; and

Fig. 5 is a partial section on the line 5—5 of Fig. 4.

In these figures, 1 indicates the crankshaft of the main motor; 2 is the auxiliary motor of the explosion or the internal combustion type, and 3 and 3' are two accessory parts, including a generator 3 of the direct or alternating current type.

In the form of construction shown in Fig. 1, the crankshaft is coupled at its end to a gearwheel 4' engaging a like wheel 5' mounted on a shaft 6', with the interposition of a free wheel 7', of a conventional type, such as is illustrated at $k$ in Patent No. 1,962,706 granted to Albert Callsen et al., on June 12, 1934, and operating in such a manner that the driving connection between the normal driving part and the normal driven part is effective to transmit torque only so long as the former is rotated faster than the latter, there being but a single direction of rotation under all conditions. The shaft 6' is connected with a friction coupling device of the friction type whose coupling power is automatically variable according to the speed of the driven part, in this case the generator 3.

As shown in Fig. 1, the clutch is of the type comprising discs which are pressed together by springs 15" combined with balls 13" mounted on the drum 9" which is keyed to the shaft of the generator 3. The apparatus is further provided with a hand-operated clutch for the release of the generator 3, and herein the said clutch comprises a member 30 acting upon the balls 13" in order to hold them out of contact with the discs, thus eliminating the pressure exerted upon the discs by the springs 15".

The shaft 6' is also connected by gearing 31—32 and a free wheel 33, to the auxiliary motor 2. This free wheel 33 is of the type adapted for jamming (i. e., driving) in both directions of rotation and comprises balls located in a frame 34 which may be held fast in a position which prevents the jamming. In this case, the said frame is held fast by means of tongues 35 mounted on the axles 36 and connected with the balls 37 which have such position that the action of the centrifugal force will cause the tongues 35 to enter the notches in the frame 34 against the action of the antagonistic springs 38. The axles 36 are mounted upon arms which are secured to the shaft 6. When the frame 34 is held fast, the free wheel will be free to move in both directions, and all connection will be broken between the auxiliary motor 2 and the generator 3.

In the idle position, the tongues 35 are moved back, and the frame 34 is free. The auxiliary motor is set running, and the free wheel 33 becomes jammed, so that the generator is now driven by means of the gearing 31—32 and the clutch 9", if this latter is thrown on. Due to the presence of the controlling member 30, the auxiliary motor 2 can be started without driving the generator 3. The free wheel 7' prevents the clutch 9" from turning the wheel 5' and hence the propelling motor. When this latter has been started, it will actuate the generator, and at this time, the speed of the clutch 9" has become greater than the former speed at the generator, which is the desired constant speed. This increase of speed is compensated by a slipping of the clutch 9" as concerns the generator, but it has the effect of separating the balls 37 against the action of the springs 38, and the said balls draw with them the tongues 35 which thus hold the frame 34 and break the connection between the generator and the starter. When the speed of the propelling motor falls below a certain rate, the generator 3 rotates with free wheel, but the tongues 35 move back under the action of the springs, due to the reduction of the centrifugal force acting upon the balls 37, and thus the free wheel 33 becomes jammed, and the generator 3 operates the auxiliary motor 2, and when this latter is started, it will in turn drive the generator. If on the contrary, the generator is uncoupled when the propelling motor is still running at this reduced speed, this motor will assure the starting of the auxiliary motor.

In this embodiment of the invention, the starting of the auxiliary motor can thus be effected either by the propelling motor alone, or by this motor with the aid of the kinetic energy of the generator.

The embodiment shown in Fig. 2 is chiefly adapted for use with a starter of a known type acting principally by the kinetic energy imparted to a flywheel. The connection between the crankshaft 1 and the generator 3 comprises the same parts as in the embodiment shown in Fig. 1, but the connection between the generator 3 and the starter 2 is different, and herein it is obtained by means of a gearwheel 40 keyed to a shaft which is driven from its end by the crankshaft of the small starting motor, which is engaged with a wheel 41, mounted, through the medium of a free-wheel 42, on the drum 9a of a friction clutch 8a forming part of the transmission device between the crankshaft 1 and the generator 3. The free wheel is so arranged that the drum 9a will rotate without turning the wheel 41 when the speed of the drum is greater than the speed of this wheel. On the other hand, the wheel 41 is secured to a friction drum 43 containing self-braking shoes which are pivotally mounted on axles 45 and carry balls which are urged by springs acting against the centrifugal force in order to bring the shoes 44 into contact with the drum 43. On the other hand, the wheel 41 serves as the driving wheel of a double pinion 47 forming the planetary pinion of an epicycloidal gear set in which one of the main wheels, 48, is fixed and the other, 49, is secured to a flywheel 50 which is loose on the shaft of the wheel 40. The second set of teeth of the double pinion 47 engages the teeth of a gear-wheel 51 keyed to the shaft 52 carrying the clutch 53 for coupling the crankshaft 1 to the starter 2.

When the motor of the starter 2 is set running, the generator 3 is actuated by means of the gearing 40—41 which is connected with the disc 12a by the free wheel 42 and by the friction clutch 8a, and also by the friction clutch 43—44. For a certain speed, which is below the normal speed selected for the generator, the balls used with the shoes 44 release the clutch 43—44, and thus when the generator is driven by the crankshaft 1, the wheel 41 is not actuated. If the crankshaft should stop, or if its speed should be too slow to drive the generator at the proper speed, the clutch 43—44 will be thrown on automatically, and this will restore the connection between the generator and the starter 2 which is now driven by the kinetic energy of the generator and the devices 8a and 44, with the optional use of the crankshaft 1 rotating at slow speed.

It will be noted that in this embodiment, the generator (or other device), the starter, and the several parts connecting these two apparatus together, or connecting each of the said apparatus with the crankshaft of the propelling motor, will form an independent combination which may be mounted as a whole upon the motor, and which may be manufactured and sold as a new accessory, as such a combination will in fact constitute a new manufactured product, and this is an important object of the present invention. It will be further remarked that the whole combination of the connecting parts is contained in a casing or box 55, which may be mounted as a whole upon the propelling motor, and is adapted to receive, at its outer part, the generator and the small motor of the explosion or the internal combustion type used for the starter. The said casing, which contains the desired transmission devices for making the connections, according to the invention, between the three apparatus in consideration, and which is further adapted for mounting as a whole upon the propelling motor and for receiving on the exterior, the generator (or other part) and the small starting motor, also forms a new manufactured product. This would be the same in the case in which the auxiliary motor is not used as a starter.

Obviously, the invention is not limited to the details of construction herein described or represented, which are given solely by way of example. For instance, it is always possible, whatever be the form of construction embodying the invention, to employ a hand-operated clutch for the generator, as well as two transmission devices for having different speed ratios between the generator and the starter as above described with reference to Fig. 1. It is also feasible to combine the control of the release of the generator with the control of the clutch used between the starter and the main motor, in such way that the controlling piece will take an intermediate position in which the generator is uncoupled, and thus when the main motor is started, the generator will not be actuated. On the other hand, the centrifugal coupling devices, whose coupling action decreases with the increase of the speed of the actuated part, may be of widely differing types, for instance with discs, with external shoes, or the like.

On the other hand, the coupling device whose capacity is variable according to the derivation of the drive, may have a wide range of construction. It is simply necessary to obtain an angular connection, with a certain ineffective movement, between the ball-carrier and the shaft of this latter, and to utilize the angular movement, thus available between these two devices, in order to produce a variation of the tension of the springs which tend to effect the coupling against the action of the centrifugal force upon the balls, or in order to produce a variation of the position of the said balls.

Fig. 3 shows a constructional form of such a device, in the case of a clutch with axial thrust. In this example, which relates to a clutch of the cone type, but which might be of the disc type, the shaft 59 of the accessory part to be operated at constant speed, carries a screw 60 engaging a nut 61 connected with a cone 62 by a grooved surface or by any other means which will allow its axial motion with reference to the said cone, but without allowing it to rotate with reference to the latter. The nut 61 may move upon the shaft 59 between two stops. This nut carries the balls 13b which are acted upon by the springs 15b in order to produce the contact between the cones 62 and 63. When the shaft 59 is the driving part, the nut 61 has the position shown in Fig. 3. When the nut 61 is the driving part, it moves axially along the screw 60 as far as its other stop, owing to the reversal of the torque. In this movement, the balls 13b, which bear upon the cone 62, will move outwardly which increases their radius of rotation and reduces the coupling capacity at a given speed.

The device herein represented further comprises a stop 64 which prevents the balls 13b from moving any further towards the axis of rotation, under the action of the spring 15b, when the nut 61 is in the position represented; as a slight play is allowed, in this position, between the said balls and the cone 62, the release is assured, whatever be the speed of the shaft 59, as long as it remains a driving part, but a slight friction is maintained between the cones 62 and 63 by weak springs 65. When the cone 63 becomes the driving part, it turns the nut 61 which thus moves to the right owing to the reversal of the torque; the balls are released from the stop 64, and under the action of the spring 15b, they will press upon the cone 62 to a degree depending upon the centrifugal force to which they are subjected.

Figs. 4 and 5 show a preferred form of construction of a centrifugal clutch whose coupling force decreases with the increase of the speed of the actuated device.

In this construction, the clutch consists of a great number of discs 70 which are pressed together between the end 71 of a drum 72, which is the driven part of the clutch, and a lower plate 73 slidable in grooves in the said drum and urged axially by springs 74 mounted in circular disposition in the other end. The particular feature of the said clutch consists in the fact that the balls 75 are mounted in the interior of the drum, in an annular space between the hub of the said drum and a sleeve 76 participating in the rotation of a disc 73 and on which the actuated discs are mounted. The advantage of this particular arrangement of the balls is that it reduces to the minimum degree the axial dimension of the clutch, which is important for aircrafts. The balls 75 are herein provided with two rollers which are adjacent but have the eccentric position, so that one roller will make contact with the end of the drum and the other with the inclined race 77 which is optionally secured to the disc 73 but which is axially movable and is so arranged that the balls 75, when they move outwardly, will separate it from the end 71, and with it, the disc 73 which presses the discs 70. The said rollers are mounted on a common shaft 78 which is perpendicular to the shaft of the clutch and is pivoted to an upright 79 secured to the end part 72. Under the action of the centrifugal force upon the balls 75, the shafts 78 will pivot slightly on the said uprights, and will thus move the rollers out of contact with the sleeve 76 upon which they rest normally, and bring them upon the inclined race 77 which imparts their force to the disc 73, thus reducing the force by which the discs 70 are pressed together.

It is to be understood, of course, that the connection between the propelling motor and the generator or other accessory need not comprise a loose wheel, but only a friction clutch of the centrifugal type, which can be automatically engaged or released, such as is shown in Fig. 3.

This application is a division of my application Serial No. 69,558 which resulted in Patent No. 2,123,219 granted July 12, 1938.

What is claimed is:

1. The combination with a pair of internal combustion engines, of a work performing unit associated therewith, a two-way overrunning clutch interposed between said engines and said work performing unit, whereby torque may be transmitted from one of said engines to said work performing unit during one stage of operation, and transmitted from said unit back to said last-named engine during a different stage of operation, and speed-responsive means for moving said clutch to the overrunning position to prevent the occurrence of said condition of torque transmission back to said last-named engine so long as the other engine operates at or above a predetermined speed.

2. In the combination of claim 1, a speed-responsive friction clutch interposed between said first-named clutch and said work performing unit, whereby slippage may occur in the event of a tendency to impart excessively high speed to said work performing unit.

3. In the combination of claim 1, a speed-responsive friction clutch interposed between said first-named clutch and said work performing unit, whereby slippage may occur in the event of a tendency to impart excessively high speed to said work performing unit, and manually operable means to supplement the speed responsive control of said second clutch.

CHARLES RAYMOND WASEIGE.